(12) United States Patent
Vyas

(10) Patent No.: US 12,489,728 B2
(45) Date of Patent: Dec. 2, 2025

(54) SYSTEMS AND METHODS FOR PREVENTING DUPLICATE NETWORK ADDRESS ASSIGNMENT FOR A NETWORK DEVICE

(71) Applicant: Verizon Patent and Licensing Inc., Basking Ridge, NJ (US)

(72) Inventor: Sanjay Ravi Vyas, Hyderabad (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 273 days.

(21) Appl. No.: 18/475,567

(22) Filed: Sep. 27, 2023

(65) Prior Publication Data

US 2025/0106181 A1    Mar. 27, 2025

(51) Int. Cl.
*H04L 61/5046* (2022.01)
*H04L 41/16* (2022.01)
*H04L 61/103* (2022.01)
*H04W 28/02* (2009.01)

(52) U.S. Cl.
CPC .......... *H04L 61/5046* (2022.05); *H04L 41/16* (2013.01); *H04L 61/103* (2013.01); *H04W 28/0215* (2013.01)

(58) Field of Classification Search
CPC ... H04L 61/5046; H04L 41/16; H04L 61/103; H04L 61/5007; H04L 61/5038; H04L 61/5092; H04L 2101/622; H04W 28/0215

USPC ........................................................ 709/224
See application file for complete search history.

(56) References Cited

U.S. PATENT DOCUMENTS

| | | | |
|---|---|---|---|
| 10,033,602 B1 * | 7/2018 | Russell | H04L 43/12 |
| 11,552,975 B1 * | 1/2023 | Zhang | H04W 4/70 |
| 2020/0137093 A1 * | 4/2020 | Janakiraman | H04L 63/0263 |
| 2021/0152590 A1 * | 5/2021 | Urias | H04L 63/1425 |
| 2021/0250325 A1 * | 8/2021 | Teflian | H04L 61/5061 |
| 2022/0095092 A1 * | 3/2022 | Siddam | H04L 63/102 |
| 2023/0231860 A1 * | 7/2023 | Tian | H04L 63/1416 726/1 |
| 2025/0016133 A1 * | 1/2025 | Ribe Costa | H04L 61/5038 |

* cited by examiner

*Primary Examiner* — Karen C Tang

(57) ABSTRACT

A device may receive a MAC address and MAC integer of a network device newly provided in a network relative to existing network devices, existing IP addresses associated with the existing network devices, and a list of available IP addresses. The device may convert the available IP addresses into integers, and may select a first available IP address. The device may identify a first integer of the first available IP address, and may combine the first integer and the MAC integer to generate a network device integer. The device may identify an IP address for the network device based on the network device integer, and may process the IP address and the existing IP addresses, with a machine learning model, to determine that the IP address is not duplicative of one of the existing IP addresses. The device may assign the IP address to the network device.

20 Claims, 10 Drawing Sheets

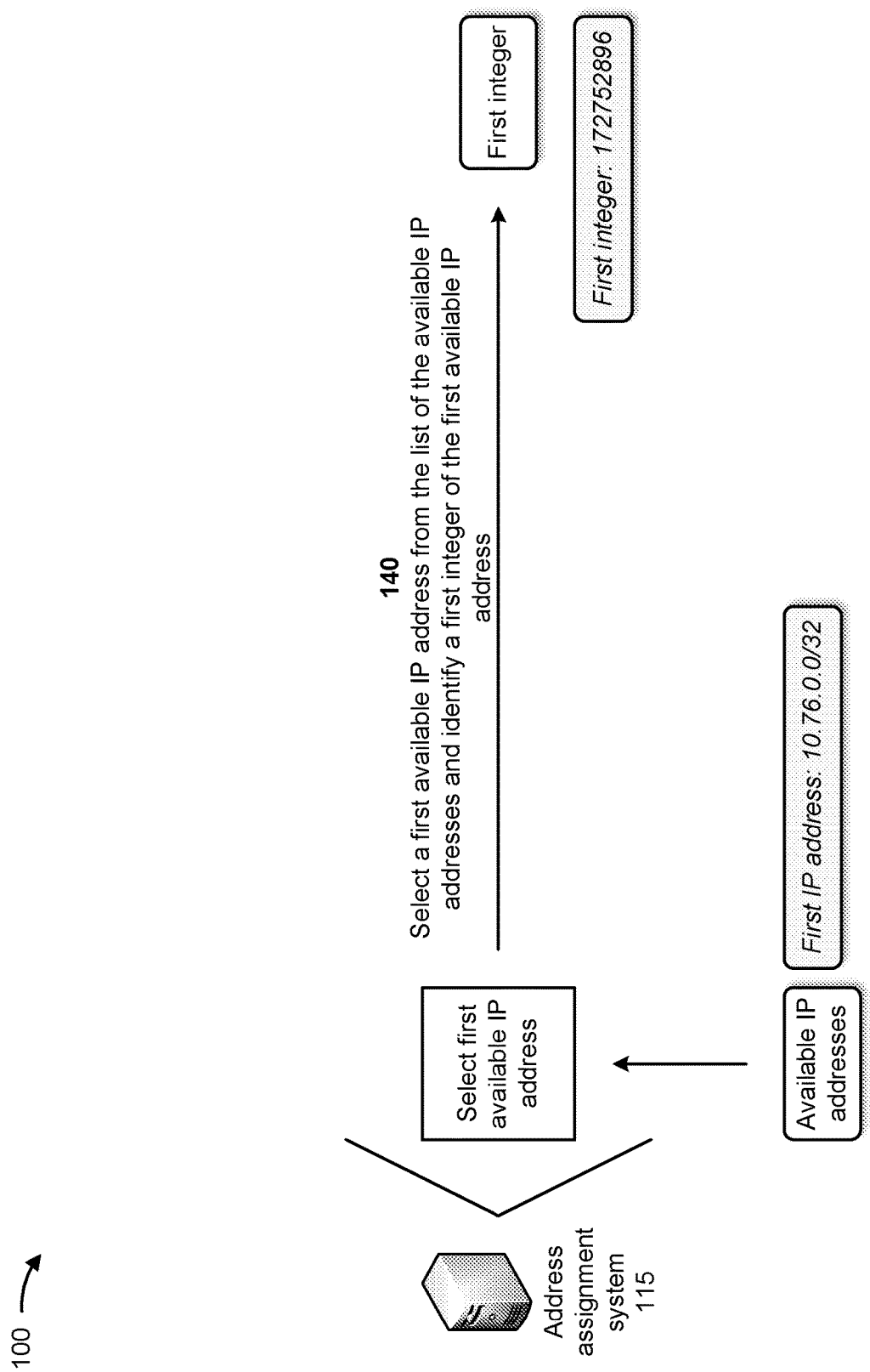

SYSTEMS AND METHODS FOR PREVENTING DUPLICATE NETWORK ADDRESS ASSIGNMENT FOR A NETWORK DEVICE

BACKGROUND

One or more base stations may be associated with a network device, such as a cell site router. A cell site router is a Layer 2/Layer 3 device that aggregates mobile data traffic from a cellular access network (e.g., one or more base stations) and transports the mobile data traffic to a service provider's core network.

BRIEF DESCRIPTION OF THE DRAWINGS

FIGS. 1A-1G are diagrams of an example associated with preventing duplicate network address assignment for a network device.

DETAILED DESCRIPTION OF EXAMPLE EMBODIMENTS

Figure 1A:
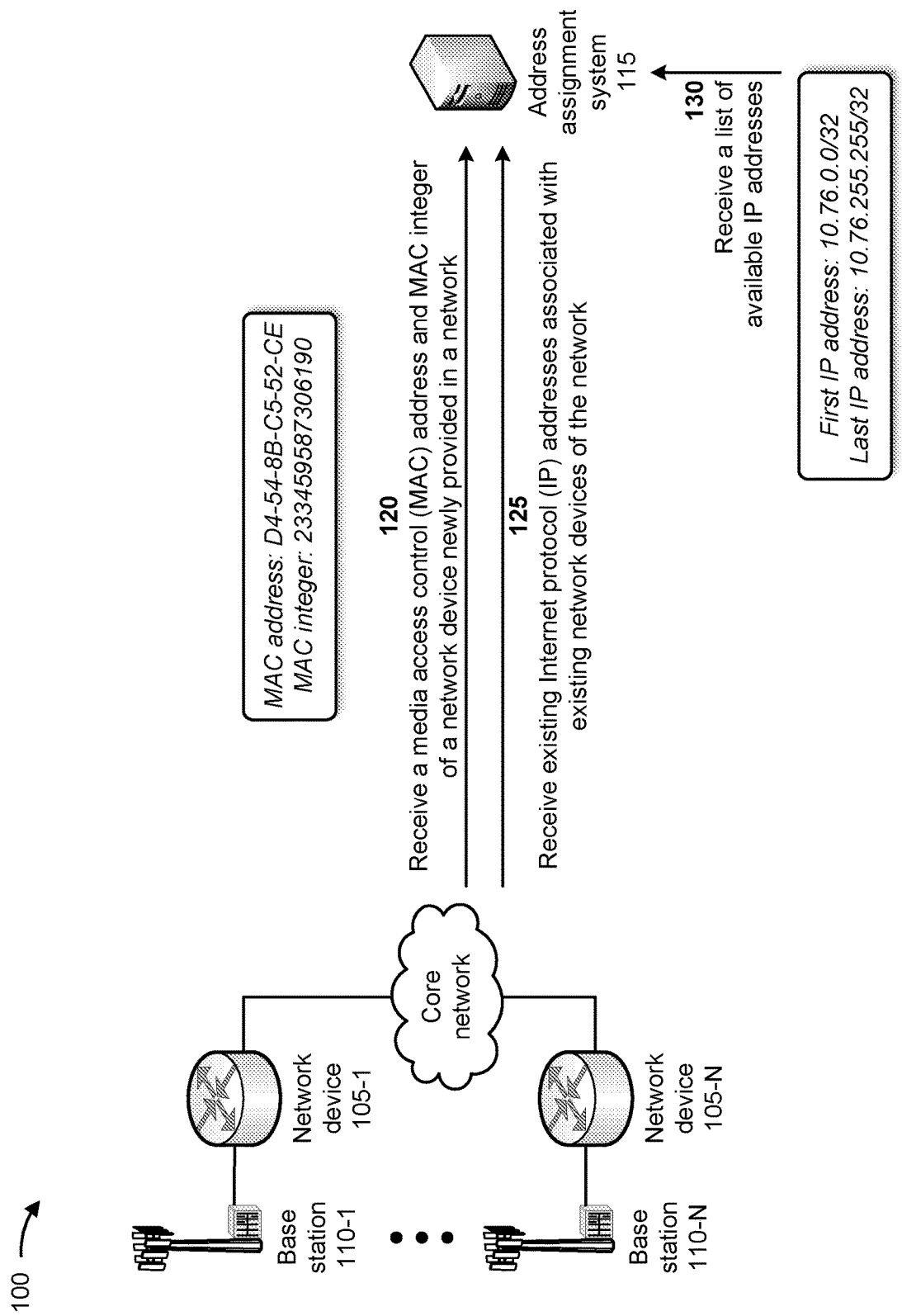

The following detailed description of example implementations refers to the accompanying drawings. The same reference numbers in different drawings may identify the same or similar elements.

A network device (e.g., a cell site router) may be assigned a network address (e.g., Internet protocol (IP) address). Currently many duplicates of IP addresses may be identified during installation of network devices, which results in a delay in a network build. A network engineer may assign a specific IP address to a network device via a naming system. The naming system may assign the specific IP address based on an inventory of available IP addresses. However, if two network devices are incorrectly assigned the same IP address, traffic may be erroneously provided to one of the network devices or duplicate traffic may unnecessarily be provided to both network devices. Thus, current techniques for handling network address assignments to network devices consume computing resources (e.g., processing resources, memory resources, communication resources, and/or the like), networking resources, and/or other resources associated with dropped traffic (e.g., packets) provided to an incorrect network device, traffic congestion due to providing the traffic to an incorrect network device, duplication of traffic to multiple network devices with the same IP address, and/or the like.

Some implementations described herein provide an address assignment system that prevents duplicate network address assignment for a network device. For example, the address assignment system may receive a MAC address and MAC integer of a network device newly provided in a network relative to existing network devices, and may receive existing IP addresses associated with the existing network devices of the network and a list of available IP addresses for the network. The address assignment system may convert the available IP addresses into integers, and may select a first available IP address from the list of available IP addresses. The address assignment system may identify a first integer of the first available IP address, and may combine the first integer and the MAC integer to generate a network device integer. The address assignment system may identify an IP address for the network device in the list of available IP addresses based on the network device integer, and may process the IP address and the existing IP addresses, with a machine learning model, to determine that the IP address is not duplicative of one of the existing IP addresses. The address assignment system may assign the IP address to the network device based on the IP address not being duplicative of one of the existing IP addresses.

In this way, the address assignment system prevents duplicate network address assignment for a network device. For example, the address assignment system may receive an integer format of a media access control (MAC) address for a network device requiring a network address. The address assignment system may combine an integer format of an available IP address and the integer format of the MAC address to generate a final integer. The address assignment system may calculate an IP address for the network device based on the final integer and may assign the IP address to the network device. Thus, the address assignment system may conserve computing resources, networking resources, and/or other resources that would have otherwise been consumed by dropped traffic (e.g., packets) provided to an incorrect network device, traffic congestion due to providing the traffic to an incorrect network device, duplication of traffic to multiple network devices with the same IP address, and/or the like.

FIGS. 1A-1G are diagrams of an example 100 associated with preventing duplicate network address assignment for a network device. As shown in FIGS. 1A-1G, example 100 includes a plurality of network devices 105-1 through 105-N (e.g., referred to herein individually as a network device 105 or plurally as network devices 105) interconnecting a plurality of base stations 110-1 through 110-N (e.g., referred to herein individually as a base station 110 or plurally as base stations 110) to a core network. The network devices 105, the base stations 110, and the core network may be associated with an address assignment system 115. Further details of the network devices 105, the base stations 110, the address assignment system 115, and the core network are provided elsewhere herein.

As shown in FIG. 1A, and by reference number 120, the address assignment system 115 may receive a media access control (MAC) address and MAC integer of a network device 105 newly provided in a network. For example, a new network device 105 may be provided in the network and may require a network address (e.g., an IP address). The network device 105 may be a cell site router, and one or more base stations may be associated with the network device 105. The network device 105 may aggregate mobile data traffic from the one or more base stations 110 and may transport the mobile data traffic to the core network. In some implementations, the network device 105 may be assigned a MAC address that includes an organizational unique identifier (OUI) and a device identifier. The OUI (e.g., the first twenty-four bits) may be the part of the MAC address that identifies a vendor of the network device 105. The device identifier (e.g., the last twenty-four bits) may be the part of the MAC address that identifies the network device 105. In some implementations, the MAC address may be converted to a MAC integer and the address assignment system 115 may receive the MAC address and the MAC integer of the network device 105. Alternatively, the address assignment system 115 may receive the MAC address and may convert the MAC address into the MAC integer. In one example, as shown in FIG. 1A, the network device 105 may be associated with a MAC address of "D4-54-8B-C5-52-CE" and a MAC integer of "233459587306190." In some implementations, the MAC address of the new network device 105 may be different than MAC addresses of existing network devices 105 of the network.

As further shown in FIG. 1A, and by reference number 125, the address assignment system 115 may receive existing IP addresses associated with existing network devices 105 of the network. For example, the existing network devices 105 of the network may be associated with existing IP addresses allocated by the address assignment system 115 to the existing network devices 105. In some implementations, the address assignment system 115 may store the existing IP addresses associated with the existing network devices 105 in a data structure (e.g., a database, a table, a list, and/or the like) associated with the address assignment system 115, and may receive the existing IP addresses associated with the existing network devices 105 from the data structure. In some implementations, the existing IP addresses associated with the existing network devices 105 may be stored in a data structure associated with the core network, and the address assignment system 115 may receive the existing IP addresses associated with the existing network devices 105 from the data structure of the core network. In some implementations, the address assignment system 115 may periodically request the existing IP addresses from the existing network devices 105 and may receive the existing IP addresses associated from the existing network devices 105 based on requesting the existing IP addresses. In some implementations, the existing IP addresses associated with the existing network devices 105 may include IP version 4 (IPv4) addresses, IP version 6 (IPv6) addresses, and/or the like.

As further shown in FIG. 1A, and by reference number 130, the address assignment system 115 may receive a list of available IP addresses. For example, the address assignment system 115 may be allotted the list of available IP addresses for assigning to new network devices 105 of the network. In some implementations, the address assignment system 115 may receive a list of available IP addresses from a network administrator (e.g., a user device associated with the network administrator), from another system associated with managing IP addresses, and/or the like. The address assignment system 115 may store the list of available IP addresses in a data structure associated with the address assignment system 115. In one example, as shown in FIG. 1A, the list of available IP addresses may include IP addresses in a range that includes a first IP address (e.g., "10.76.0.0/32") and a last IP address (e.g., "10.76.255.255/32"). In some implementations, the available IP addresses may include IPv4 addresses, IPv6 addresses, and/or the like.

Figure 1B:
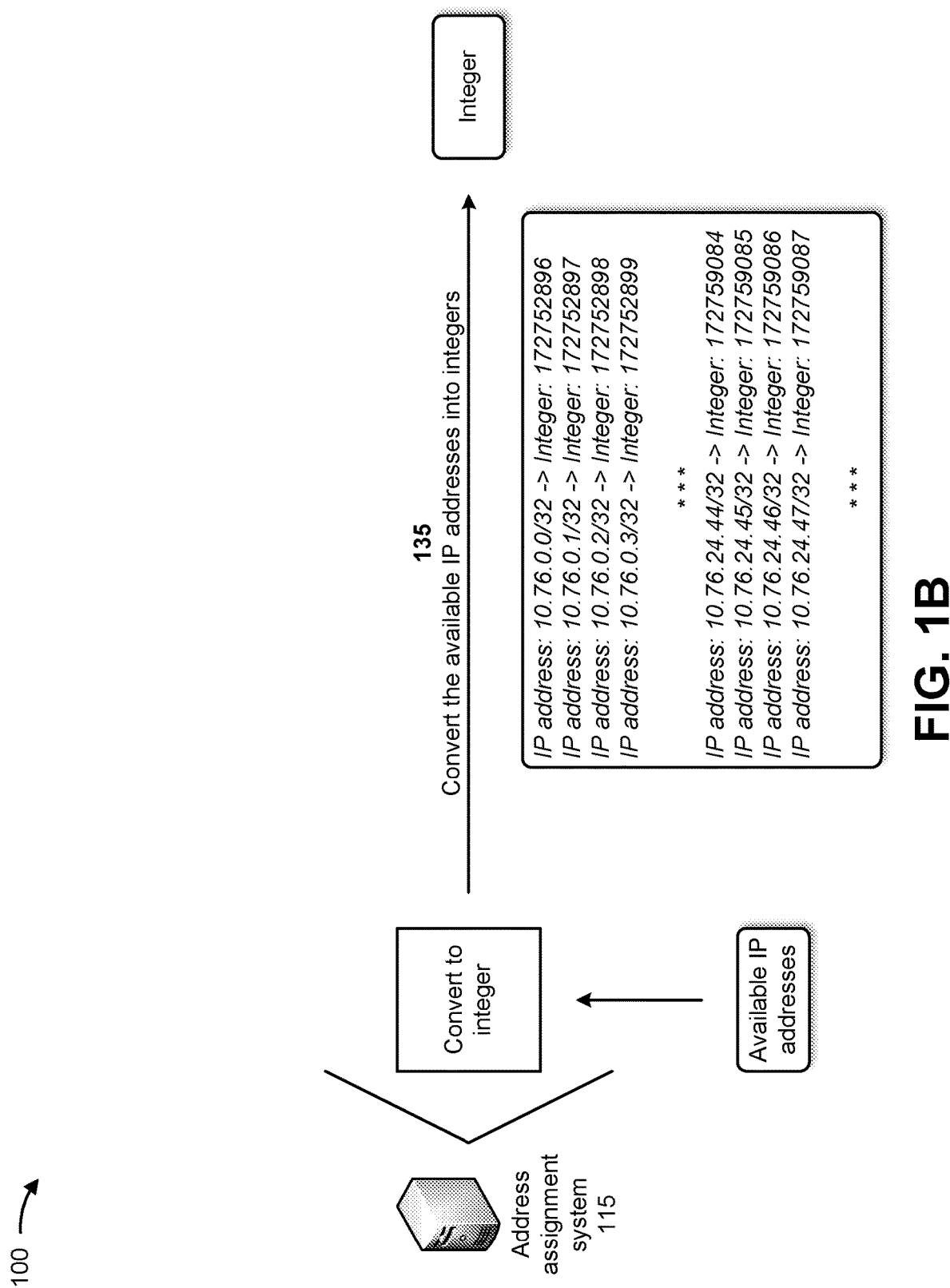

As shown in FIG. 1B, and by reference number 135, the address assignment system 115 may convert the available IP addresses into integers. For example, each of the available IP addresses may be divided into sub-blocks (e.g., an IPV4 address may be divided into four sub-blocks). Each sub-block may include a different weight number powered by a number (e.g., 256). To convert an available IP address into an integer, the address assignment system 115 may multiple each sub-block of the available IP address by a corresponding weight number to generate results, and may add the results together to generate the integer. For example, for an available IP address of "192.168.0.1," the first sub-block "192" may be associated with a weight number of "16777216," the second sub-block "168" may be associated with a weight number of "65536," the third sub-block "0" may be associated with a weight number of "256," and the fourth sub-block "1" may be associated with a weight number of "1." The address assignment system 115 may multiply each sub-block and corresponding weight number and may add the results to generate the integer as follows: 16777216*192+65536*168+256*0+1*1=3,232,235,521.

The address assignment system 115 may store the integers corresponding to the list of available IP addresses in a data structure associated with the address assignment system 115. In one example, as shown in FIG. 1B, the list of available IP addresses and corresponding integers may include the following: "IP address: 10.76.0.0/32→Integer: 172752896," "IP address: 10.76.0.1/32→Integer: 172752897," "IP address: 10.76.0.2/32→Integer: 172752898," "IP address: 10.76.0.3/32→Integer: 172752899," . . . , "IP address: 10.76.24.44/32→Integer: 172759084," "IP address: 10.76.24.45/32→Integer: 172759085," "IP address: 10.76.24.46/32→Integer: 172759086," "IP address: 10.76.24.47/32→Integer: 172759087," . . . , etc.

As shown in FIG. 1C, and by reference number 140, the address assignment system 115 may select a first available IP address from the list of the available IP addresses and may identify a first integer of the first available IP address. For example, in order to assign an IP address to the new network device 105, the address assignment system 115 may select one of the available IP addresses from the list of available IP addresses. In some implementations, the address assignment system 115 may select the first available IP address (e.g., "10.76.0.0/32") from the list of available IP addresses. The address assignment system 115 may identify (e.g., in the data structure associated with the address assignment system 115) the first integer (e.g., "172752896") associated with the first available IP address. The address assignment system 115 may utilize the first integer to generate an IP address for the new network device 105.

Figure 1D:
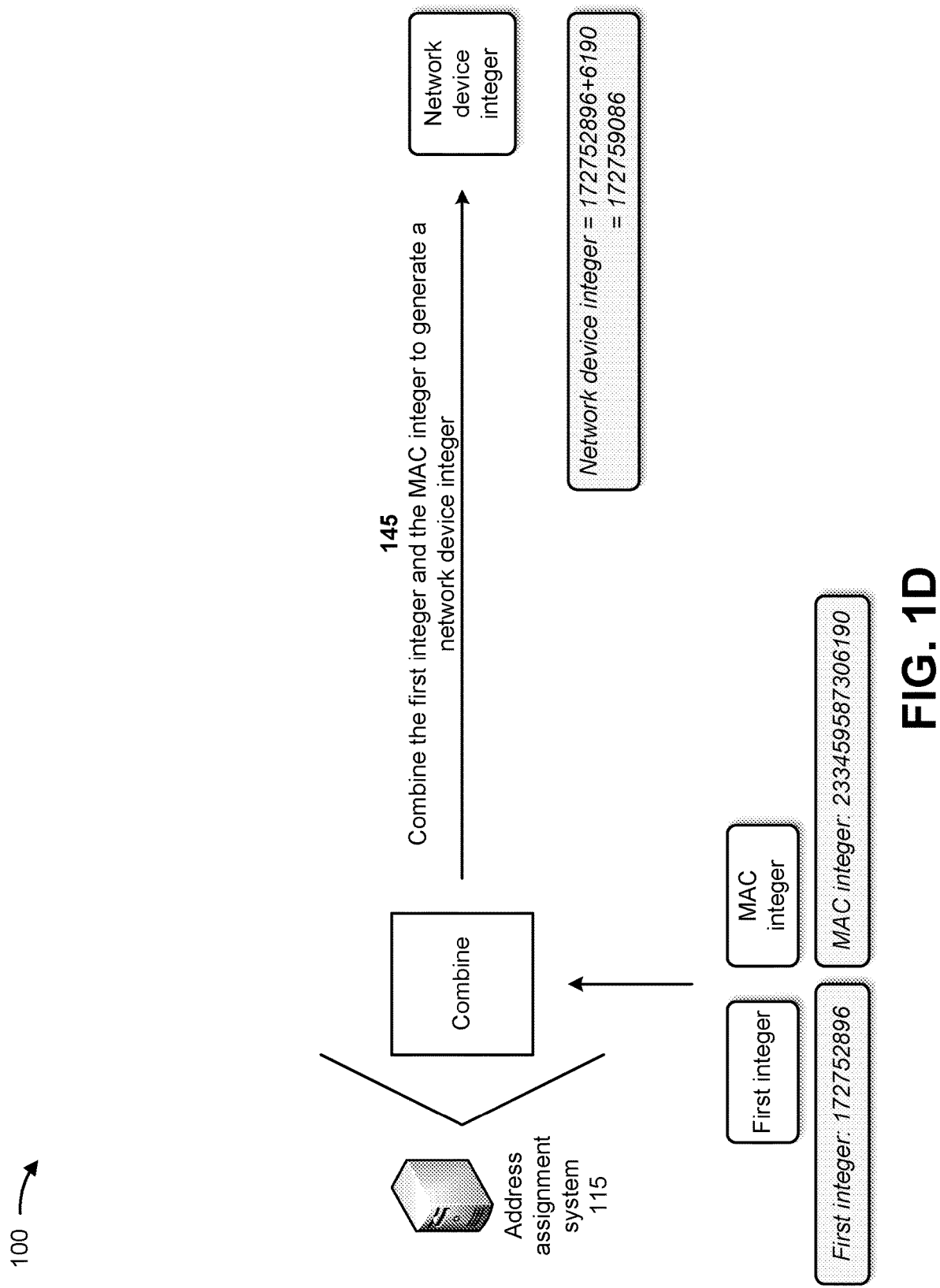

As shown in FIG. 1D, and by reference number 145, the address assignment system 115 may combine the first integer and the MAC integer to generate a network device integer. For example, in order to generate the IP address for the new network device 105, the address assignment system 115 may combine the first integer and the MAC integer to generate the network device integer in order to generate the IP address for the new network device. In some implementations, when combining the first integer and the MAC integer to generate the network device integer, the address assignment system 115 may add the first integer and a portion (e.g., one or more digits) of the MAC integer to generate the network device integer. In some implementations, when combining the first integer and the MAC integer to generate the network device integer, the address assignment system 115 may add the first integer and a quantity of digits of the MAC integer to generate the network device integer. In some implementations, when combining the first integer and the MAC integer to generate the network device integer, the address assignment system 115 may add the first integer (e.g., "172752896") and a last four digits (e.g., "6190") of the MAC integer to generate the network device integer (e.g., "172759086"), as shown in FIG. 1D.

Figure 1E:
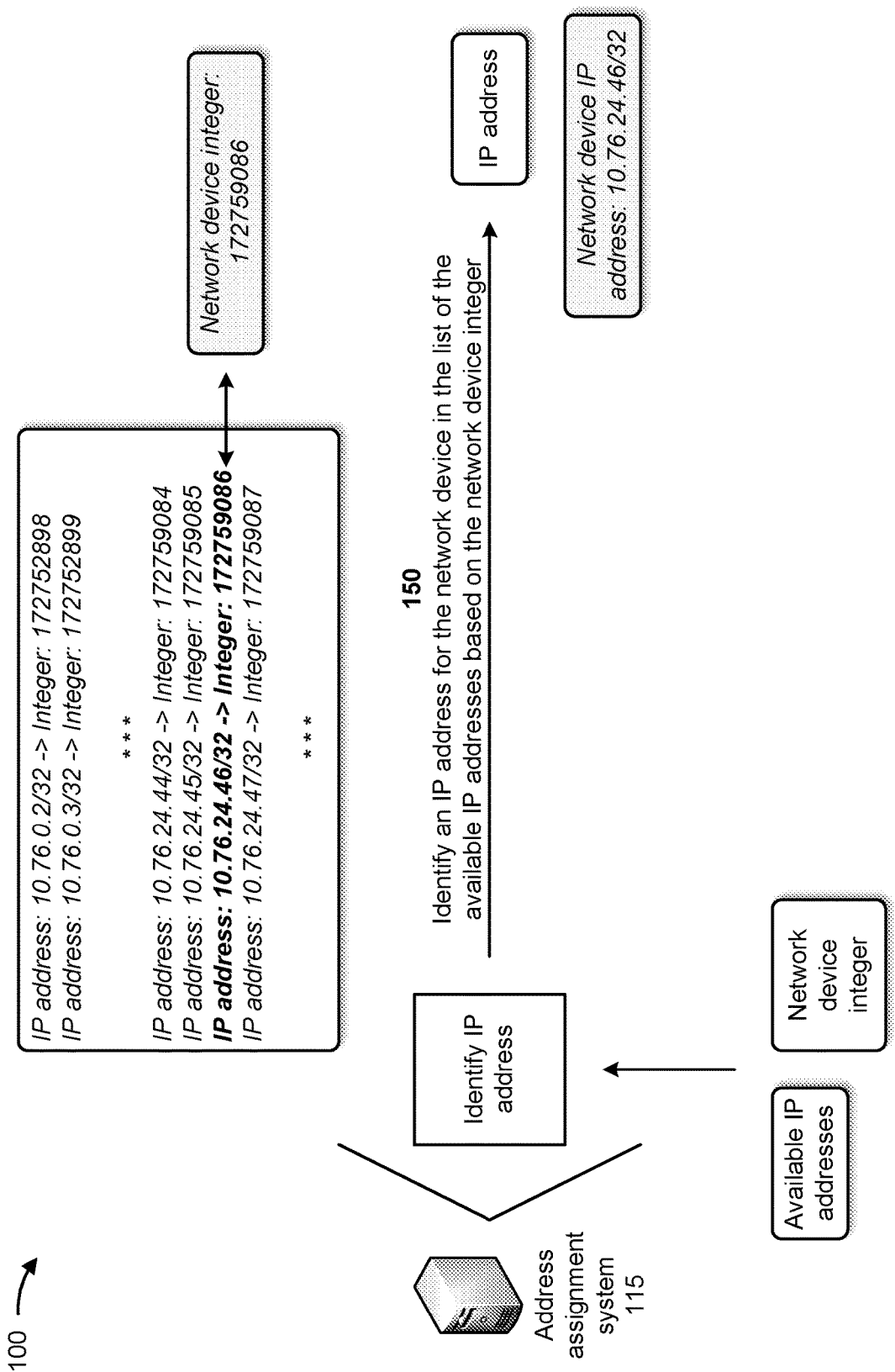

As shown in FIG. 1E, and by reference number 150, the address assignment system 115 may identify an IP address for the network device 105 in the list of available IP addresses based on the network device integer. For example, when identifying the IP address for the new network device 105 in the list of the available IP addresses based on the network device integer, the address assignment system 115 may identify an integer, converted from one of the available IP addresses, that matches the network device integer. The address assignment system 115 may designate the one of the available IP addresses as the IP address for the new network device 105. In one example, as shown in FIG. 1E, the address assignment system 115 may identify, in the list of available IP addresses and corresponding integers, an integer that matches the network device integer (e.g., "172759086"). The address assignment system 115 may identify the available IP address (e.g., "10.76.24.46/32") corresponding to the matching integer and may designate the available IP address (e.g., "10.76.24.46/32") as the IP address for the new network device 105. In some implementations, the address assignment system 115 may assign the IP address to the new network device 105.

Figure 1F:
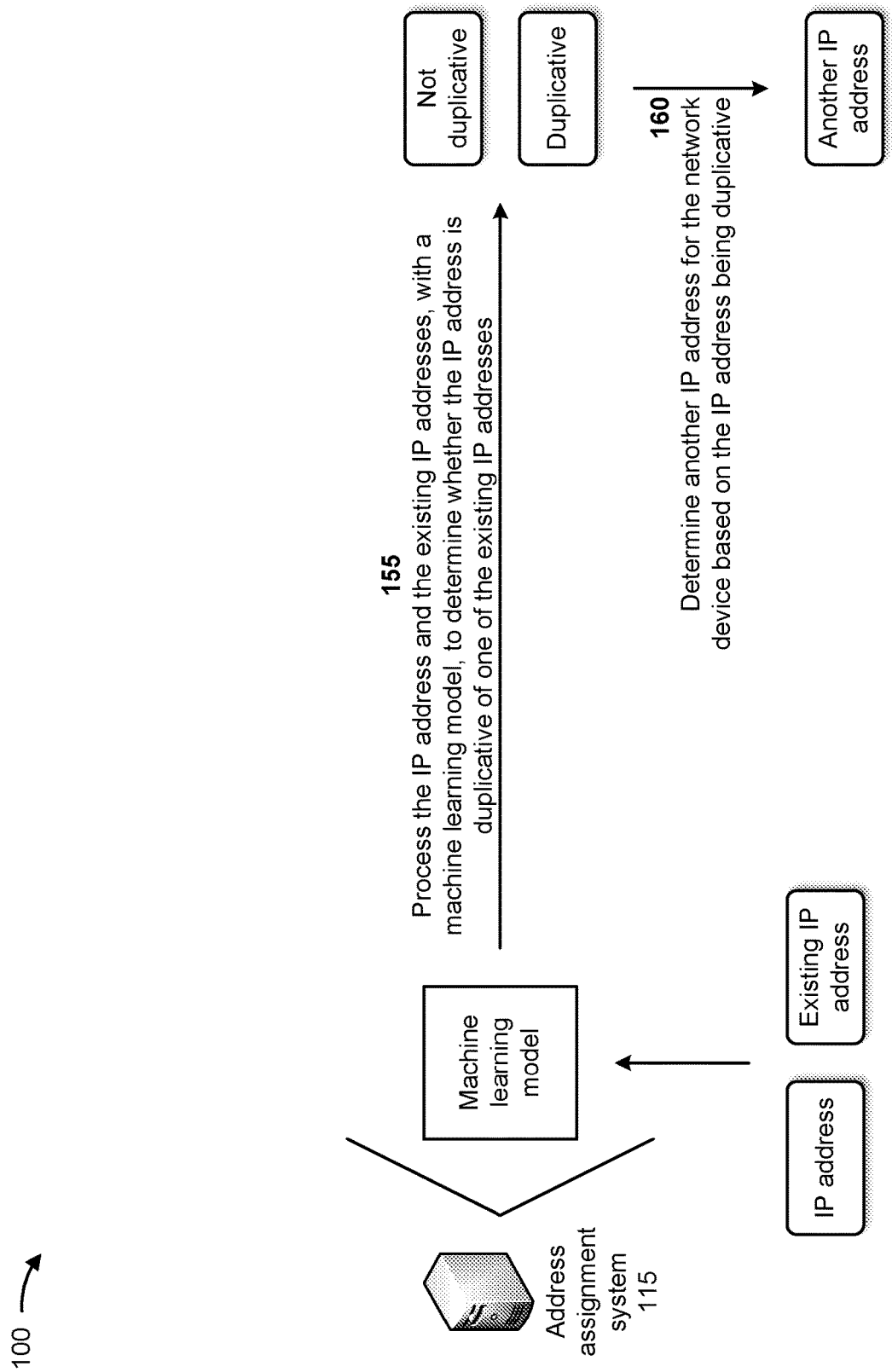

As shown in FIG. 1F, and by reference number 155, the address assignment system 115 may process the IP address and the existing IP addresses, with a machine learning model, to determine whether the IP address is duplicative of one of the existing IP addresses. For example, the address assignment system 115 may be associated with a machine learning model (e.g., a linear regression machine learning model) that determines whether an IP address is duplicative of one of the existing IP addresses. The address assignment system 115 may provide the IP address and the existing IP addresses to the machine learning model. The machine learning model may process the IP address and the existing IP addresses to determine whether the IP address is duplicative of one of the existing IP addresses. In some implementations, the machine learning model may determine that the IP address is duplicative of one of the existing IP addresses. Alternatively, the machine learning model may determine that the IP address is not duplicative of one of the existing IP addresses.

As further shown in FIG. 1F, and by reference number 160, the address assignment system 115 may determine another IP address for the network device 105 based on the IP address being duplicative. For example, when the machine learning model determines that the IP address is duplicative of one of the existing IP addresses, the address assignment system 115 may select a next available IP address and may perform the functions described above in connection with FIGS. 1C-1E to determine another IP address for the new network device 105. The address assignment system 115 may repeat this process until an IP address that is not duplicative of one of the existing IP addresses is determined for the new network device 105.

Figure 1G:
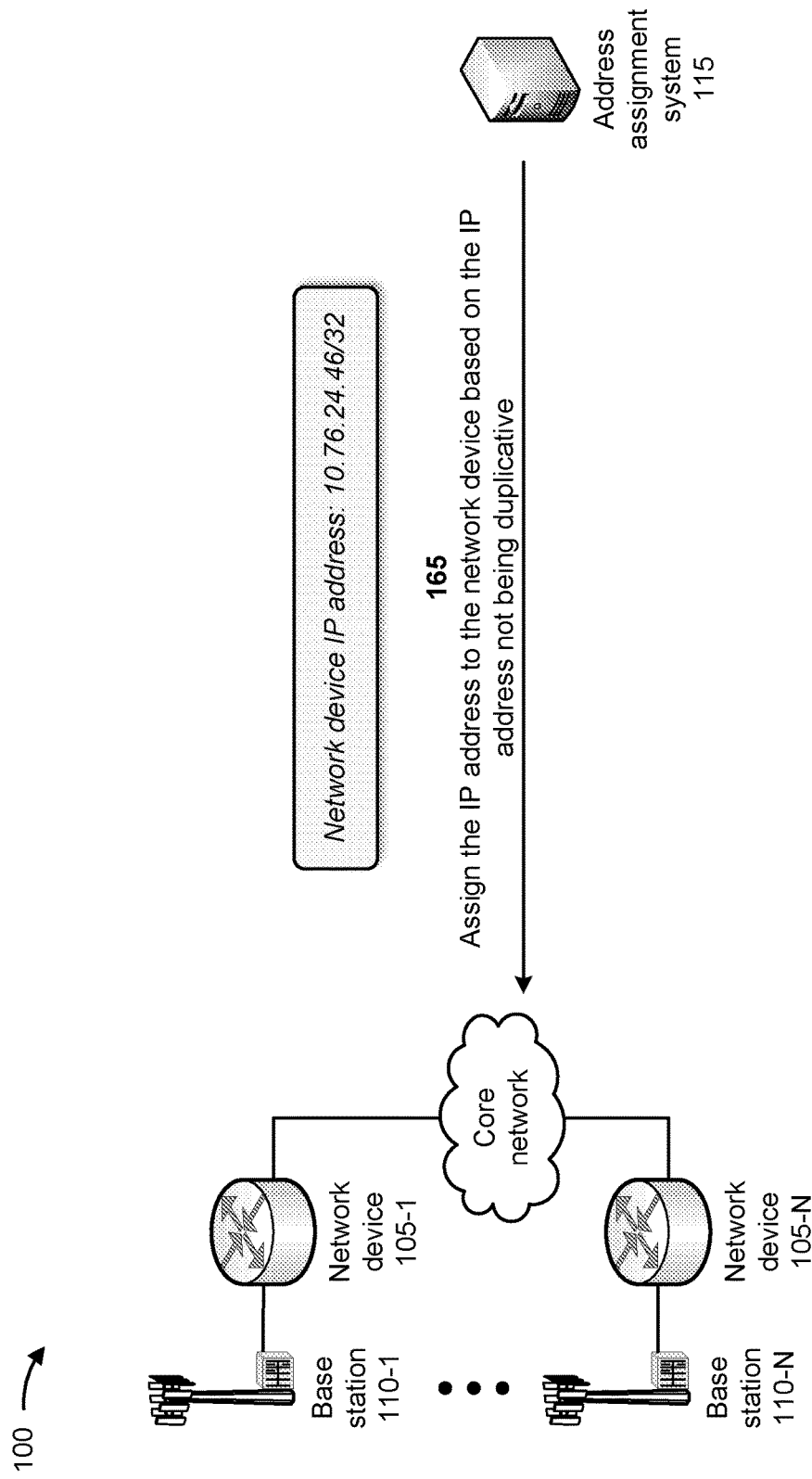

As shown in FIG. 1G, and by reference number 165, the address assignment system may assign the IP address to the network device 105 based on the IP address not being duplicative. For example, when the machine learning model determines that the IP address is not duplicative of one of the existing IP addresses, the address assignment system 115 may assign the IP address to the new network device 105. The address assignment system 115 may store the IP address of the new network device 105 in the data structure with the existing IP addresses so that the IP address may not be assigned to another new network device 105 in the future.

In this way, the address assignment system 115 prevents duplicate network address assignment for a network device 105. For example, the address assignment system 115 may receive an integer format of a MAC address for a network device 105 requiring a network address. The address assignment system 115 may combine an integer format of an available IP address and the integer format of the MAC address to generate a final integer. The address assignment system 115 may calculate an IP address for the network device 105 based on the final integer and may assign the IP address to the network device 105. Thus, the address assignment system 115 may conserve computing resources, networking resources, and/or other resources that would have otherwise been consumed by dropped traffic (e.g., packets) provided to an incorrect network device 105, traffic congestion due to providing the traffic to an incorrect network device 105, duplication of traffic to multiple network devices 105 with the same IP address, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
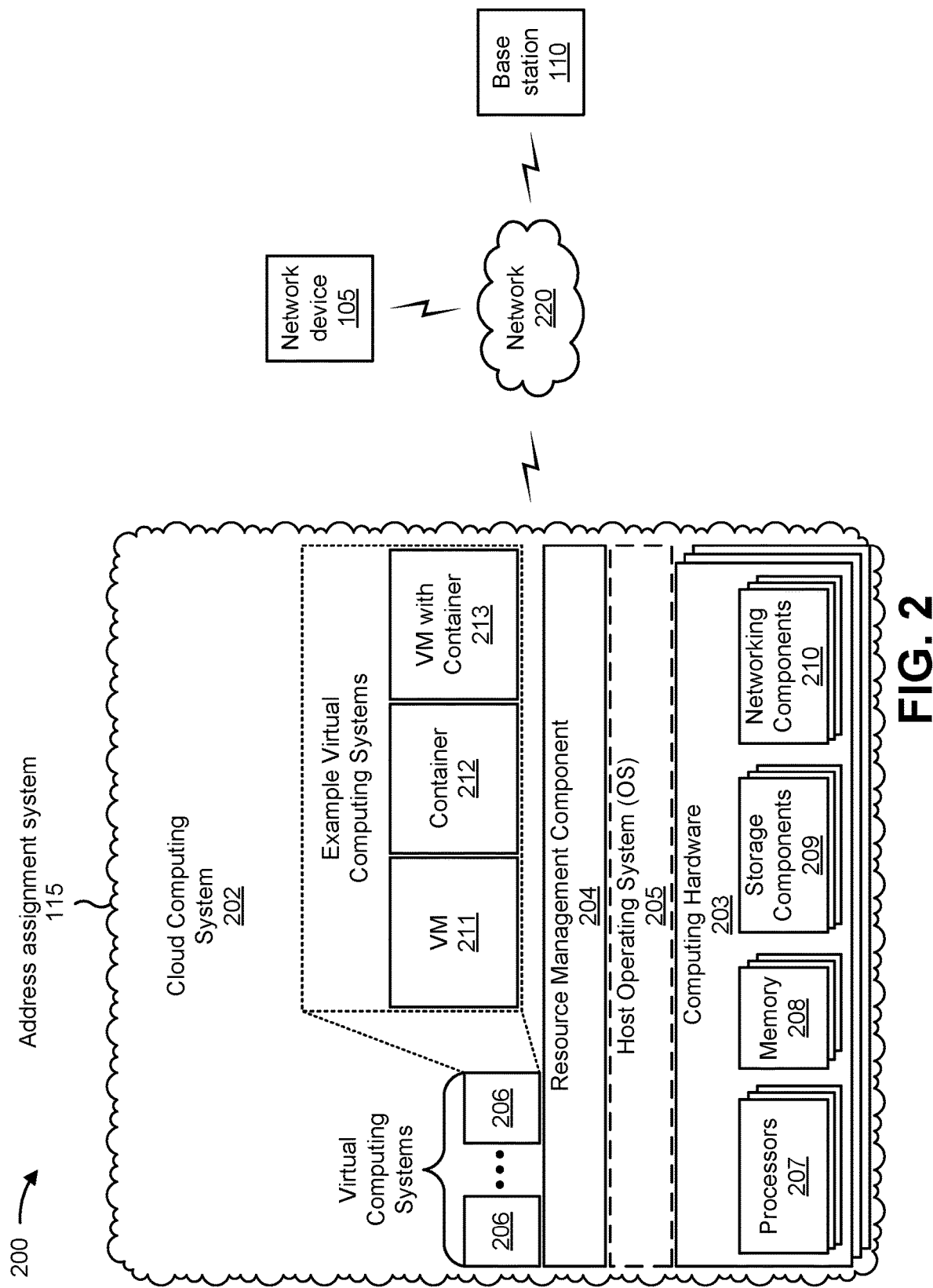
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include the address assignment system 115, which may include one or more elements of and/or may execute within a cloud computing system 202. The cloud computing system 202 may include one or more elements 203-213, as described in more detail below. As further shown in FIG. 2, the environment 200 may include the network device 105, the base station 110, and/or a network 220. Devices and/or elements of the environment 200 may interconnect via wired connections and/or wireless connections.

The network device 105 may include one or more devices capable of receiving, processing, storing, routing, and/or providing traffic (e.g., a packet and/or other information or metadata) in a manner described herein. For example, the network device 105 may include a router, such as a label switching router (LSR), a label edge router (LER), an ingress router, an egress router, a provider router (e.g., a provider edge router or a provider core router), a virtual router, or another type of router. Additionally, or alternatively, the network device 105 may include a gateway, a switch, a firewall, a hub, a bridge, a reverse proxy, a server (e.g., a proxy server, a cloud server, or a data center server), a load balancer, and/or a similar device. In some implementations, the network device 105 may be a physical device implemented within a housing, such as a chassis. In some implementations, the network device 105 may be a virtual device implemented by one or more computing devices of a cloud computing environment or a data center. In some implementations, a group of network devices 105 may be a group of data center nodes that are used to route traffic flow through a network.

The base station 110 includes one or more devices capable of transferring traffic, such as audio, video, text, and/or other traffic, destined for and/or received from a user equipment. For example, the base station 110 may include an eNodeB (eNB) associated with a long term evolution (LTE) network that receives traffic from and/or sends traffic to a core network, a gNodeB (gNB) associated with a RAN of a 5G network, a base transceiver station, a radio base station, a base station subsystem, a cellular site, a cellular tower, an access point, a transmit receive point (TRP), a radio access node, a macrocell base station, a microcell base station, a picocell base station, a femtocell base station, and/or another network entity capable of supporting wireless communication. The base station 110 may support, for example, a cellular radio access technology (RAT). The base station 110 may transfer traffic between a user equipment (e.g., using a cellular RAT), one or more other base stations 110 (e.g., using a wireless interface or a backhaul interface, such as a wired backhaul interface), and/or a core network. The base station 110 may provide one or more cells that cover geographic areas.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of the computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using the computing hardware 203. As shown, the virtual computing system 206 may include a virtual machine 211, a container 212, or a hybrid environment 213 that includes a virtual machine and a container, among other examples. The virtual computing system 206 may execute one or more applications using a file system that includes binary files, software libraries, and/or other resources required to execute applications on a guest operating system (e.g., within the virtual computing system 206) or the host operating system 205.

Although the address assignment system 115 may include one or more elements 203-213 of the cloud computing system 202, may execute within the cloud computing system 202, and/or may be hosted within the cloud computing system 202, in some implementations, the address assignment system 115 may not be cloud-based (e.g., may be implemented outside of a cloud computing system) or may be partially cloud-based. For example, the address assignment system 115 may include one or more devices that are not part of the cloud computing system 202, such as the device 300 of FIG. 3, which may include a standalone server or another type of computing device. The address assignment system 115 may perform one or more operations and/or processes described in more detail elsewhere herein.

The network 220 may include one or more wired and/or wireless networks. For example, the network 220 may include a cellular network (e.g., a 5G network, a 4G network, an LTE network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks. The network 220 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
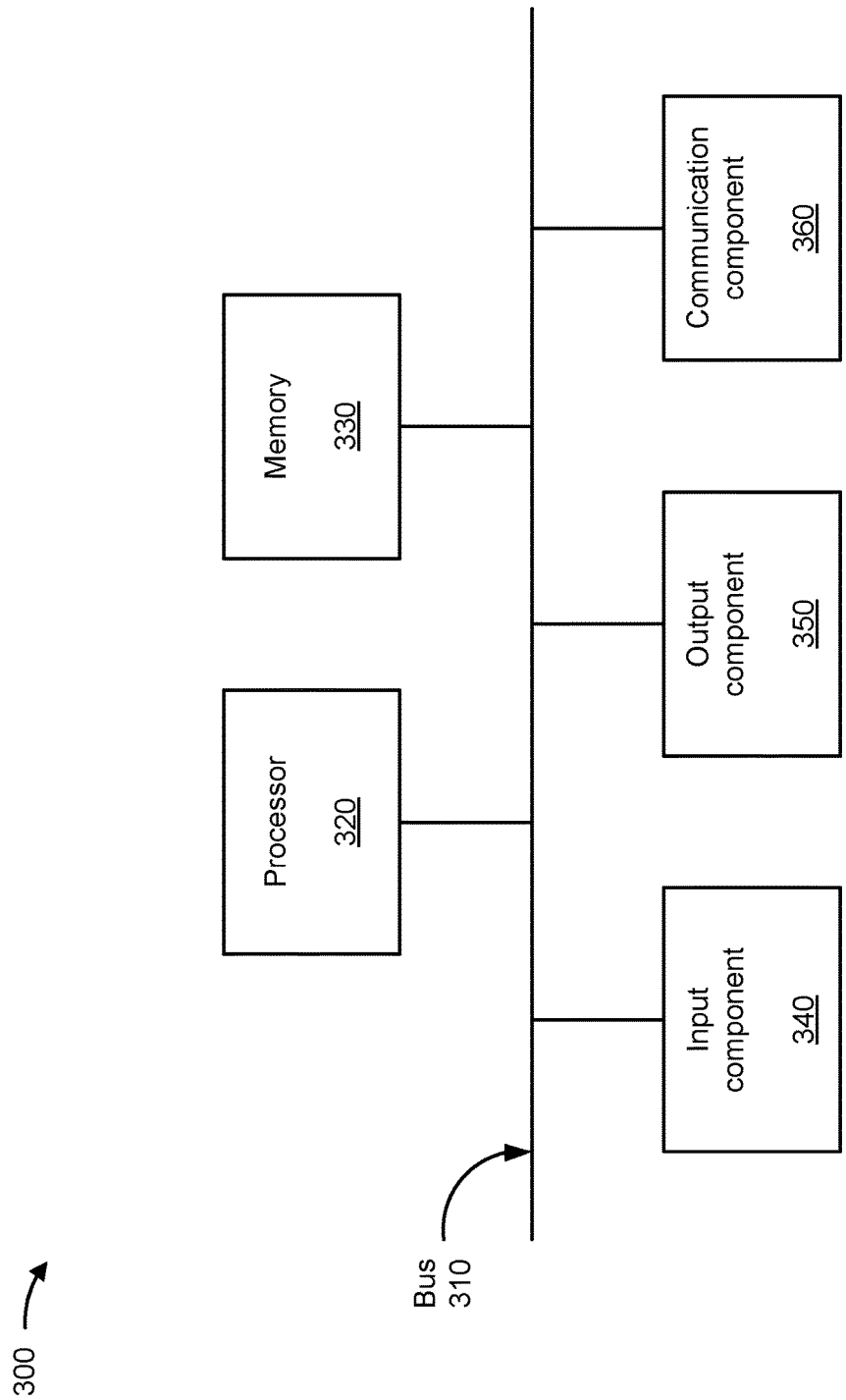
FIG. 3 is a diagram of example components of one or more devices of FIG. 2.

FIG. 3 is a diagram of example components of a device 300, which may correspond to the network device 105, the base station 110, and/or the address assignment system 115. In some implementations, the network device 105, the base station 110, and/or the address assignment system 115 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
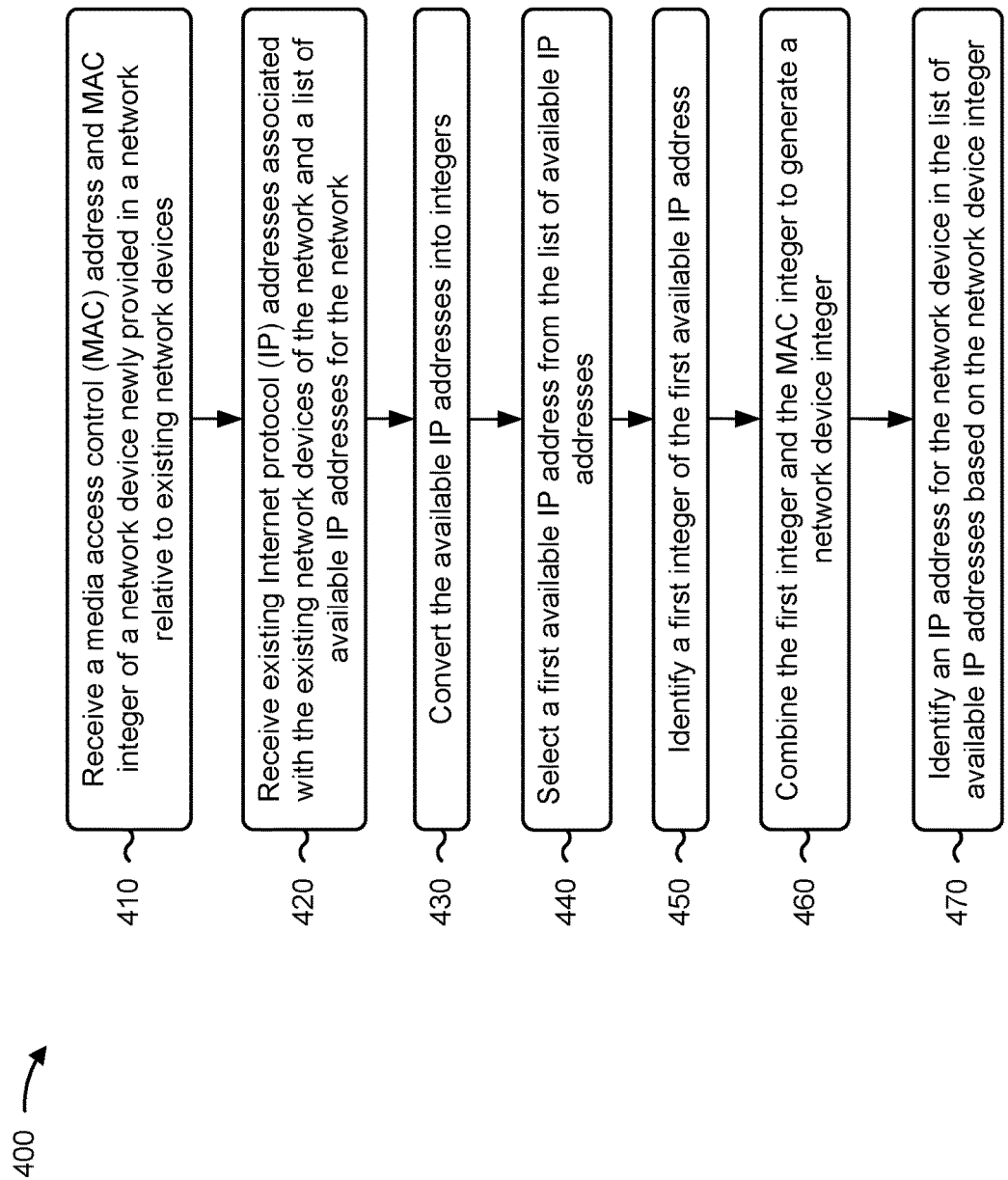
FIG. 4 is a flowchart of an example process for preventing duplicate network address assignment for a network device.

FIG. 4 is a flowchart of an example process 400 for preventing duplicate network address assignment for a network device. In some implementations, one or more process blocks of FIG. 4 may be performed by a device (e.g., the address assignment system 115). In some implementations, one or more process blocks of FIG. 4 may be performed by another device or a group of devices separate from or including the device, such as a network device (e.g., the network device 105) and/or a base station (e.g., the base station 110). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving a MAC address and MAC integer of a network device newly provided in a network relative to existing network devices (block 410). For example, the device may receive a MAC address and MAC integer of a network device newly provided in a network relative to existing network devices, as described above. In some implementations, the MAC address of the network device is different than MAC addresses of the existing network devices of the network. In some implementations, the network device is a cell site router of the network. In some implementations, the MAC address is converted to the MAC integer based on an organizational unique identifier and a device identifier of the MAC address.

As further shown in FIG. 4, process 400 may include receiving existing IP addresses associated with the existing network devices of the network and a list of available IP addresses for the network (block 420). For example, the device may receive existing IP addresses associated with the existing network devices of the network and a list of available IP addresses for the network, as described above.

As further shown in FIG. 4, process 400 may include converting the available IP addresses into integers (block 430). For example, the device may convert the available IP addresses into integers, as described above.

As further shown in FIG. 4, process 400 may include selecting a first available IP address from the list of available IP addresses (block 440). For example, the device may select a first available IP address from the list of available IP addresses, as described above.

As further shown in FIG. 4, process 400 may include identifying a first integer of the first available IP address (block 450). For example, the device may identify a first integer of the first available IP address, as described above.

As further shown in FIG. 4, process 400 may include combining the first integer and the MAC integer to generate a network device integer (block 460). For example, the device may combine the first integer and the MAC integer to generate a network device integer, as described above. In some implementations, combining the first integer and the MAC integer to generate the network device integer includes adding the first integer and a portion of the MAC integer to generate the network device integer. In some implementations, combining the first integer and the MAC integer to generate the network device integer includes adding the first integer and a quantity of digits of the MAC integer to generate the network device integer. In some implementations, combining the first integer and the MAC integer to generate the network device integer includes adding the first integer and a last four digits of the MAC integer to generate the network device integer.

As further shown in FIG. 4, process 400 may include identifying an IP address for the network device in the list of available IP addresses based on the network device integer (block 470). For example, the device may identify an IP address for the network device in the list of available IP addresses based on the network device integer, as described above. In some implementations, each of the IP address, the existing IP addresses, and the available IP addresses is an IP version 4 address. In some implementations, each of the IP address, the existing IP addresses, and the available IP addresses is an IP version 6 address. In some implementations, identifying the IP address for the network device in the list of available IP addresses based on the network device integer includes identifying an integer, converted from one of the available IP addresses, that matches the network device integer, and designating the one of the available IP addresses as the IP address for the network device.

In some implementations, process 400 includes processing the IP address and the existing IP addresses, with a machine learning model, to determine that the IP address is not duplicative of one of the existing IP addresses, and assigning the IP address to the network device based on the IP address not being duplicative of one of the existing IP addresses. In some implementations, process 400 includes storing the list of available IP addresses and the integers associated with the available IP addresses in a data structure associated with the device. In some implementations, process 400 includes storing the IP address for the network device and the network device integer in a data structure associated with the device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, a media access control (MAC) address and MAC integer of a network device newly provided in a network relative to existing network devices;
   receiving, by the device, existing Internet protocol (IP) addresses associated with the existing network devices of the network and a list of available IP addresses for the network;
   converting, by the device, the available IP addresses into integers;
   selecting, by the device, a first available IP address from the list of available IP addresses;
   identifying, by the device, a first integer of the first available IP address;
   combining, by the device, the first integer and the MAC integer to generate a network device integer; and
   identifying, by the device, an IP address for the network device in the list of available IP addresses based on the network device integer.

2. The method of claim 1, further comprising:
   processing the IP address and the existing IP addresses, with a machine learning model, to determine that the IP address is not duplicative of one of the existing IP addresses; and
   assigning the IP address to the network device based on the IP address not being duplicative of one of the existing IP addresses.

3. The method of claim 1, wherein combining the first integer and the MAC integer to generate the network device integer comprises:
   adding the first integer and a portion of the MAC integer to generate the network device integer.

4. The method of claim 1, wherein combining the first integer and the MAC integer to generate the network device integer comprises:
adding the first integer and a quantity of digits of the MAC integer to generate the network device integer.

5. The method of claim 1, wherein combining the first integer and the MAC integer to generate the network device integer comprises:
adding the first integer and a last four digits of the MAC integer to generate the network device integer.

6. The method of claim 1, wherein the network device is a router of the network.

7. The method of claim 1, further comprising:
storing the list of available IP addresses and the integers associated with the available IP addresses in a data structure associated with the device.

8. A device, comprising:
one or more processors configured to:
receive a media access control (MAC) address and MAC integer of a network device newly provided in a network relative to existing network devices;
receive existing Internet protocol (IP) addresses associated with the existing network devices of the network and a list of available IP addresses for the network;
convert the available IP addresses into integers;
select a first available IP address from the list of available IP addresses;
identify a first integer of the first available IP address;
combine the first integer and the MAC integer to generate a network device integer;
identify an IP address for the network device in the list of available IP addresses based on the network device integer; and
process the IP address and the existing IP addresses, with a machine learning model, to determine whether the IP address is duplicative of one of the existing IP addresses; and
selectively:
assign the IP address to the network device based on the IP address not being duplicative of one of the existing IP addresses, or
assign another IP address to the network device based on the IP address being duplicative of one of the existing IP addresses.

9. The device of claim 8, wherein the one or more processors are further configured to:
store the IP address for the network device and the network device integer in a data structure associated with the device.

10. The device of claim 8, wherein the machine learning model is a linear regression machine learning model.

11. The device of claim 8, wherein each of the IP address, the existing IP addresses, and the available IP addresses is an IP version 4 address.

12. The device of claim 8, wherein each of the IP address, the existing IP addresses, and the available IP addresses is an IP version 6 address.

13. The device of claim 8, wherein the MAC address is converted to the MAC integer based on an organizational unique identifier and a device identifier of the MAC address.

14. The device of claim 8, wherein the one or more processors, to identify the IP address for the network device in the list of available IP addresses based on the network device integer, are configured to:
identify an integer, converted from one of the available IP addresses, that matches the network device integer; and
designate the one of the available IP addresses as the IP address for the network device.

15. A non-transitory computer-readable medium storing a set of instructions, the set of instructions comprising:
one or more instructions that, when executed by one or more processors of a device, cause the device to:
receive a media access control (MAC) address and MAC integer of a network device newly provided in a network relative to existing network devices;
receive a list of available IP addresses for the network;
convert the available IP addresses into integers;
select a first available IP address from the list of available IP addresses;
identify a first integer of the first available IP address;
combine the first integer and the MAC integer to generate a network device integer;
identify an IP address for the network device in the list of available IP addresses based on the network device integer; and
assign the IP address to the network device.

16. The non-transitory computer-readable medium of claim 15, wherein the one or more instructions, that cause the device to combine the first integer and the MAC integer to generate the network device integer, cause the device to:
add the first integer and a portion of the MAC integer to generate the network device integer.

17. The non-transitory computer-readable medium of claim 15, wherein the one or more instructions, that cause the device to combine the first integer and the MAC integer to generate the network device integer, cause the device to:
add the first integer and a quantity of digits of the MAC integer to generate the network device integer.

18. The non-transitory computer-readable medium of claim 15, wherein the one or more instructions, that cause the device to combine the first integer and the MAC integer to generate the network device integer, cause the device to:
add the first integer and a last four digits of the MAC integer to generate the network device integer.

19. The non-transitory computer-readable medium of claim 15, wherein the MAC address is converted to the MAC integer based on an organizational unique identifier and a device identifier of the MAC address.

20. The non-transitory computer-readable medium of claim 15, wherein the one or more instructions, that cause the device to identify the IP address for the network device in the list of available IP addresses based on the network device integer, cause the device to:
identify an integer, converted from one of the available IP addresses, that matches the network device integer; and
designate the one of the available IP addresses as the IP address for the network device.

* * * * *